Sept. 15, 1942.   J. R. TUCKER   2,295,879
INTERNAL COMBUSTION ENGINE
Filed April 7, 1941   5 Sheets-Sheet 1

INVENTOR:
JOHN R. TUCKER,
BY
ATTORNEY.

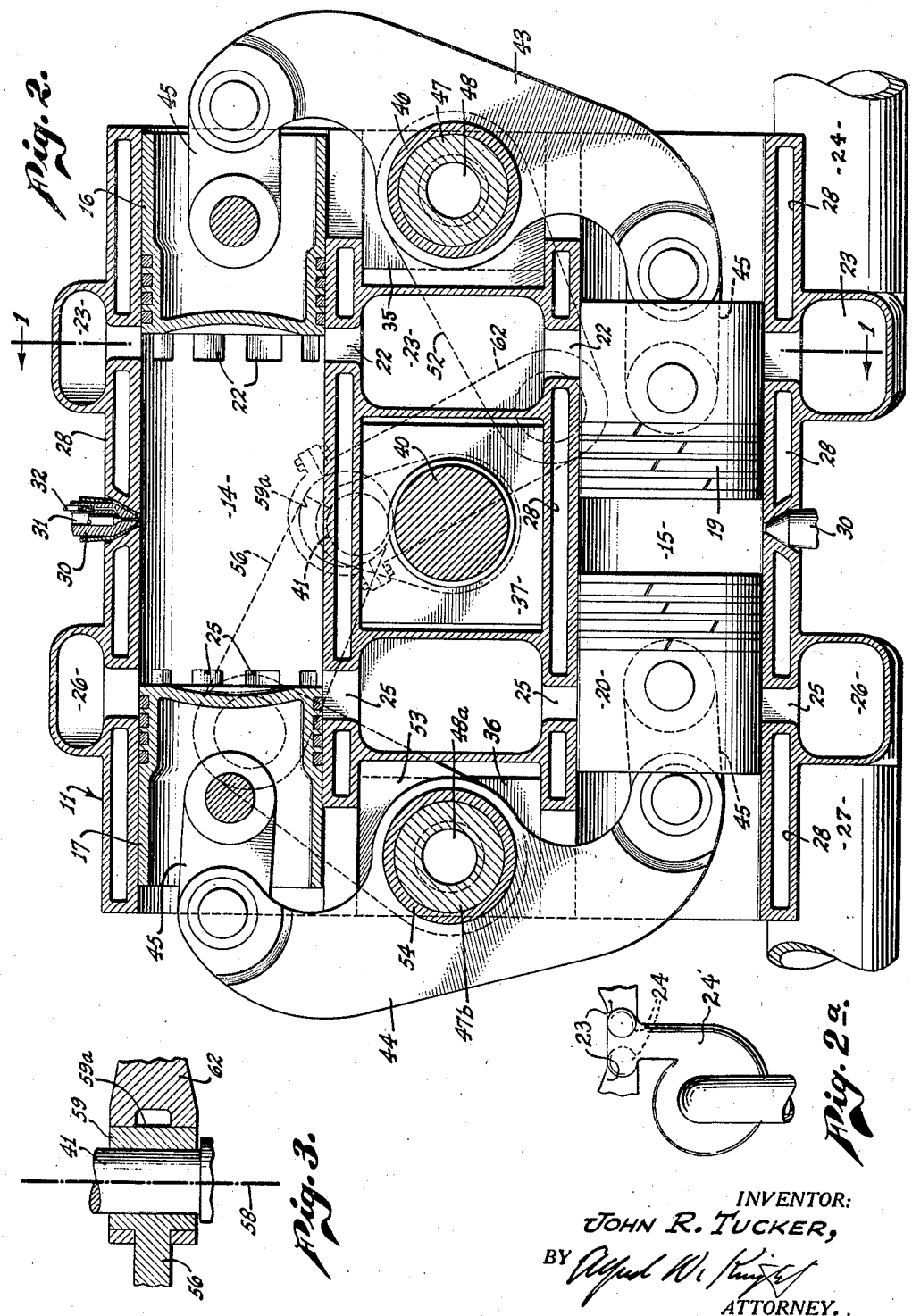

Sept. 15, 1942.   J. R. TUCKER   2,295,879
INTERNAL COMBUSTION ENGINE
Filed April 7, 1941   5 Sheets-Sheet 3

INVENTOR:
JOHN R. TUCKER,
BY
ATTORNEY.

Sept. 15, 1942.   J. R. TUCKER   2,295,879
INTERNAL COMBUSTION ENGINE
Filed April 7, 1941   5 Sheets-Sheet 4
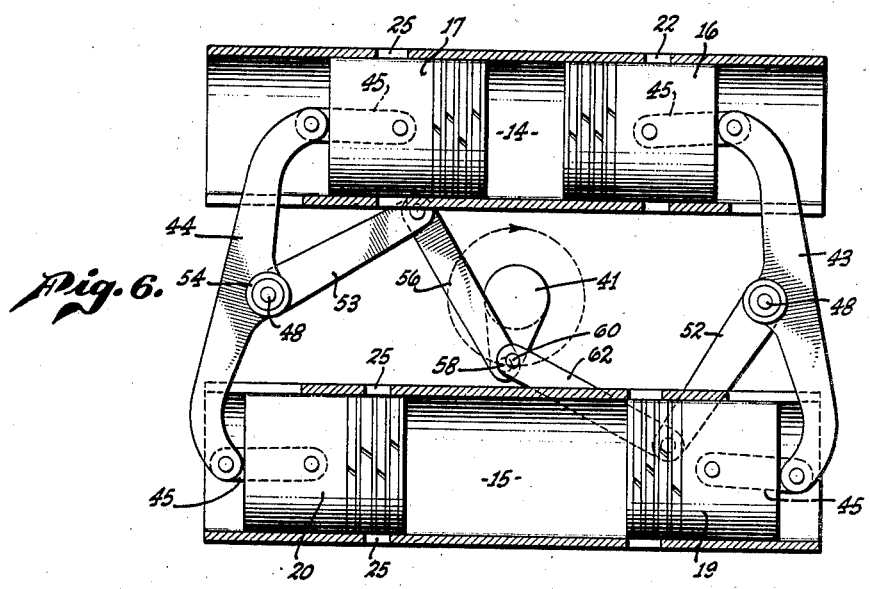
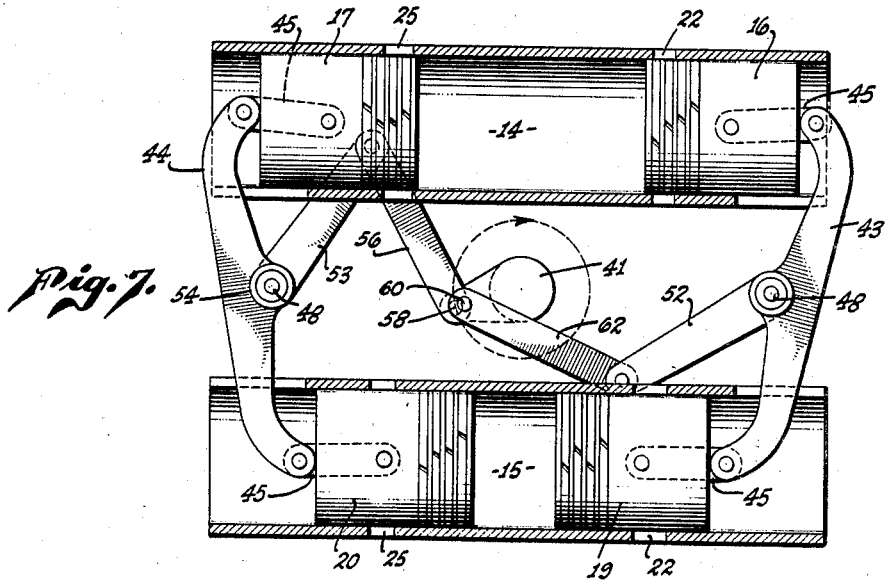
INVENTOR:
JOHN R. TUCKER,
BY
ATTORNEY.

Sept. 15, 1942.  J. R. TUCKER  2,295,879
INTERNAL COMBUSTION ENGINE
Filed April 7, 1941  5 Sheets-Sheet 3

INVENTOR:
JOHN R. TUCKER,
BY Alfred W. Knight
ATTORNEY.

Patented Sept. 15, 1942

2,295,879

UNITED STATES PATENT OFFICE 2,295,879

INTERNAL COMBUSTION ENGINE

John R. Tucker, La Crescenta, Calif., assignor to James G. Davidson, La Crescenta, Calif.

Application April 7, 1941, Serial No. 387,242

7 Claims. (Cl. 123—51)

The present invention relates generally to internal combustion engines, and especially to engines of the two-cycle type having two or more cylinders in each of which two pistons operate with opposed movement, each cylinder having intake and exhaust ports in the cylinder wall.

Because of its many advantages when used in connection with the Diesel cycle, the present invention is shown and described as being applied to an engine of the Diesel type, but it is to be understood that the invention is not limited thereto; for example, it may also be applied to spark-ignited engines using light hydrocarbon fuels, such as gasoline.

Two-cycled engines of the valveless, opposed-piston type have several advantages which will be only briefly set forth here since these advantages are known to those skilled in the art. In general, it is possible to make an engine of this type quite compact for the amount of power delivered, and this is of great importance where space is at a premium as it generally is in all types of power-driven vehicles. An engine of this character consists essentially of one or more units of which one unit comprises two cylinders with the necessary drive linkage. Since these two cylinders are arranged in a single plane, the forces exerted are balanced, and it is possible to eliminate many unbalanced or eccentric forces present in other types of engines. This characteristic results in the particular advantage that a lighter type of construction may be used. Another advantage is that there is, in general, a very small amount of wear on the cylinders since these engines operate with relatively low piston speeds and there is very little angular thrust of the pistons against the cylinder walls. The two-cycle, opposed-piston engine is also characterized by economy of operation and high fuel efficiency, especially in Diesel type engines.

Each cylinder is provided with one or more inlet ports and one or more outlet ports which are uncovered by the pistons in the cylinder to permit gases to enter and leave the cylinder. The inlet ports are arranged in a row or ring near one end of the cylinder and are fully uncovered by one piston when it reaches that end of the cylinder at the end of the working stroke. The exhaust ports are arranged in a similar row or ring at the opposite end of the cylinder and are fully uncovered by the other piston when it reaches the other end of the cylinder. The exhaust ports are so arranged with respect to the intake ports that they are partly uncovered before the inlet ports are uncovered at all in order to permit a portion of the waste gases under pressure to escape before the intake ports open. This is done in conventional engines either by making the exhaust ports longer, or by placing them nearer to the center of the cylinder, than the intake ports.

When the intake ports are uncovered by one of the two pistons, a charge of air under pressure enters the cylinder and sweeps out the products of combustion. In an ordinary engine having a conventional arrangement of the intake and exhaust ports and the usual symmetrical movement of the two pistons, because the exhaust ports are the first ports to start opening, they are not closed until an appreciable time after the inlet ports have been closed. As a consequence, some of the charge of air escapes through the exhaust ports, the amount depending upon the interval of time elapsing between closing the two sets of ports. If the incoming air stream also carries vaporized fuel, a portion of the fuel charge is likewise lost through the exhaust ports. As a result of the escape of more or less of the clean air, the advantage of the initial compression of the gas under the intake pressure is lost, and the efficiency and fuel consumption of the engine are correspondingly affected.

Various attempts have heretofore been made to overcome this defect in opposed-piston engines. In some engines the arrangement or location of the ports in the cylinder walls has been changed. Thus, for example, in some engines scavenging air is admitted through one set of ports while air carrying a charge of vaporized fuel is admitted through a second set of ports, both sets being located near one end of the cylinder and uncovered by the same piston. Other engines have been provided with modified forms of driving linkage connecting the piston to the crankshaft. In one engine of this type, the connecting rods are made of unequal lengths, thus changing the strokes of the two pistons. In general, however, these prior engines are all open to the same objection that the exhaust ports remain open for a short length of time after the inlet ports have been closed, and during this time interval some of the charge of fuel or air supplied to the cylinder through the intake ports escapes through the open exhaust ports, with a consequent reduction in operating efficiency because of loss of compression and loss of fuel.

Thus it becomes a general object of my invention to provide a two-cycle internal combustion engine of the opposed-piston type in which the exhaust port in each cylinder is at least partly open before the intake port in that cylinder starts to open, and the exhaust port is fully closed in that cylinder before the intake port in the same cylinder is fully closed in order to retain in the cylinder the full charge of gas entering the cylinder through the intake port.

It is also a general object of my invention to provide means in a two-cycle internal combustion engine of the opposed-piston type for controlling the motion of the two pistons in each cylinder in such a way that the exhaust port in each cylinder is fully closed by one piston while the intake port in that same cylinder is at least partly open or uncovered by the other piston.

Another object of my invention is to provide an internal combustion engine of the opposed-piston type having but a single crankshaft to which the pistons at opposite ends of the cylinders are connected by similar driving linkages.

Another object is to provide an engine which is compact and requires a minimum of space, as an engine of this type not only is particularly desired where space is at a premium, but such an engine also weighs less for a given amount of power produced.

These and other objects of my invention are attained in an internal combustion engine of the two-cycle opposed-piston type having one or more pairs of parallel cylinders each provided with spaced intake and exhaust ports, by providing means, interconnecting the pistons with the crankshaft, of such character as to control the movement of the pistons to open partially the exhaust port in each cylinder before the intake port in that cylinder is opened, and to close said exhaust port before said intake port is fully closed. This interconnecting means which serves to transmit the power from the pistons to the crankshaft comprises a rocking lever located at each end of the pair of cylinders and connected at its two ends to one piston in each cylinder; an arm rigidly secured to each rocking lever and oscillating therewith; a crankshaft, preferably provided with but a single crank; and a pair of connecting rods connected at one end to the crank and at the other end to one of the arms oscillated by a rocking lever. The two connecting rods are of equal length. Although both are attached at one end to the same crank, which rotates with a uniform rotational motion, they produce such movement of the pistons as to close the exhaust port in each cylinder before the associated intake port is closed by virtue of eccentric connections of the two connecting rods to the crank.

The connection is such that the axis of rotation of one connecting rod relative to the crank is spaced from the axis of rotation of the other connecting rod relative to the same crank in a direction transverse to the longitudinal axis of one connecting rod. Structurally, this is preferably accomplished by connecting one rod directly to a journal bearing on the crank and providing that rod with a second journal bearing which surrounds but is eccentric with respect to the journal bearing on the crank itself, and attaching the second connecting rod to the eccentric journal bearing on the first connecting rod, thus providing a definite fixed offset between the axes of rotation of the respective connecting rods with respect to the crank.

How the above as well as other objects and advantages of my invention not specifically mentioned are attained will be more readily understood by reference to the following specification and the annexed drawings, in which:

Fig. 2 is a vertical section through one pair of cylinders on line 2—2 of Fig. 1;

Fig. 2a is a fragmentary elevational view, on reduced scale, showing the provision of a centrifugal pump connected to the intake manifolds of the engine and constituting a source of air under pressure, as it would appear looking toward the engine from the right-hand side of Fig. 2;

Fig. 3 is a fragmentary sectional view through the connection of the two connecting rods to the crank of the drive shaft on line 3—3 of Fig. 9;

Figs. 4, 5, 6, 7 and 8 are diagrammatic representations of one pair of cylinders and the driving linkage connecting the four pistons in the two cylinders to the single crank, the figures being arranged to show a sequence of operations through a complete half-cycle in each cylinder.

Figure 1:
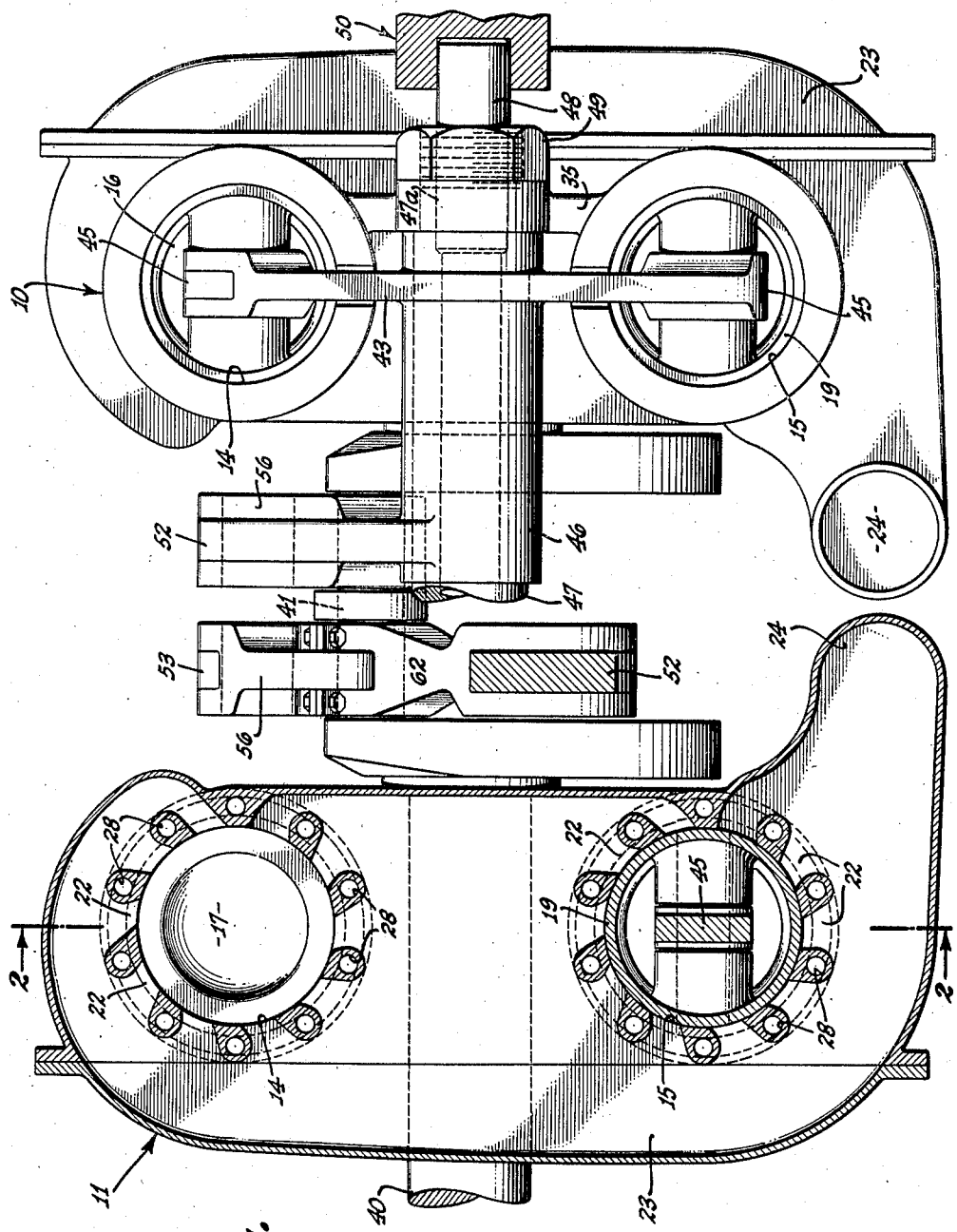
Fig. 1 is a combined end elevation and vertical section, on line 1—1 of Fig. 2, of a four-cylinder engine constructed in accordance with my invention, the disclosure being simplified by omission of as many parts as possible not directly concerned with the present invention, as such omitted parts may be of any conventional construction.

The engine shown in Figs. 1 and 2 is a four-cylinder engine made up of two cylinder blocks, each block containing two cylinders. These cylinder blocks are generally indicated at 10 and 11 respectively. The cylinders are shown as extending horizontally, as it is contemplated that this will be the usual position, but it will be understood that the cylinders may be vertical or in any other position desired. Consequently, it will be appreciated that directional terms, such as "upper," "lower," "right," "left," etc., are used for purposes of description and are not limitative upon the invention, since the arrangement of the various parts may be altered from that shown in the drawings.

Cylinder block 11 comprises a pair of horizontally extending, parallel cylinders 14 and 15 which are arranged one above the other. The cylinders are open at both ends to permit connection of the driving linkage to the pistons reciprocating within the cylinders. Pistons 16 and 17 reciprocate horizontally within cylinder 14, and pistons 19 and 20 reciprocate within cylinder 15.

In the right hand portion, as viewed in Fig. 2, of each cylinder there is a plurality of intake ports 22 arranged in a row or ring around the entire periphery of the cylinder, as shown in Fig. 1. It is preferred to have several small ports 22 in order to obtain an even distribution of incoming gases in each cylinder; but it will be understood that the plurality of ports may be replaced with a single port, and consequently, for the purposes of this invention, the several small openings 22 may be considered as being a single intake port. The intake ports 22 of both cylinders 14 and 15 communicate with a common intake manifold 23 which surrounds the annularly arranged intake openings or ports 22 of both cylnders 14 and 15, and which is connected at one end 24 to some suitable source of air under pressure. This source may be of any conventional type, known to persons skilled in the art; but in general the source is a centrifugal blower or pump, as shown at 24' in Fig. 2a, which delivers air to manifold 23 under a suitable superatmospheric pressure.

Intake ports 22 in cylinders 14 and 15 are covered and uncovered by pistons 16 and 19 respectively; and the ports are so positioned in the walls of the cylinders that they are fully uncovered when the pistons have reached the extreme limits of their outward movement in the cylinders, which occurs at the ends of their working strokes. The total area of intake openings 22 should be sufficient to permit an adequate flow of air into the cylinder, but the axial length of the openings should be held to a minimum in order to keep gas pressure on the piston for as long a time as possible during the working stroke.

In the other end portion of each cylinder 14 and 15 there is a plurality of openings 25 in the cylinder wall which are exhaust ports, the construction and arrangement of these ports being similar to that of inlet ports 22. The several openings 25 are arranged in a row or ring around the cylinder wall, and also may be considered to operate as a single exhaust port. The exhaust ports in cylinders 14 and 15 are so located that they are fully uncovered when pistons 17 and 20 respectively have reached the extreme ends of their outward movement at the ends of their working strokes.

The exhaust ports of both cylinders 14 and 15 open into a common exhaust manifold 26 which is similar in shape and arrangement to inlet manifold 23. The exhaust manifold is provided with an outlet at one end 27 which is connected to a suitable muffler or the like, or the exhaust manifold may vent directly to the atmosphere.

It will be seen from Fig. 2 that the cylinders are preferably of the usual double wall construction in order that the intermediate space 28 may be filled with a liquid cooling medium, such as water, which circulates around the cylinders to keep them from becoming overheated. In order that circulation of the cooling medium throughout this jacket space 28 may be uninterrupted, each portion of the cylinder wall between two adjacent inlet ports is provided with a horizontally extending fluid passage 28a, as shown in Fig. 1, by means of which the cooling liquid may pass the ports and reach the portions of the cylinder wall at each side of the ports. A similar provision is made at the exhaust ports.

Each cylinder extends beyond the intake ports and the exhaust ports for a distance approximately equal to the length of a piston. With cylinders of this length, when pistons 16 and 17 reach the extreme limits of their motion away from each other, which is just slightly beyond the positions of pistons 16 and 17 shown in Fig. 2, the skirt end of the piston just protrudes beyond the cylinder. These extensions of the cylinder beyond the firing chamber provide full length guides for the pistons at the outer ends of their paths.

The pistons in each cylinder move toward each other during the compression stroke, but do not meet in order to leave at the center of the cylinder a space containing a highly compressed quantity of air. At the center of the cylinder in a position to communicate with this body of compressed air, there is located a fuel injector 30 which may be of any suitable kind. As typical of conventional devices of the solid injection type, fuel injector 30 in Fig. 2 is shown as comprising a cylindrical body with a tapered end in which a fuel injecting plunger 31 operates to inject a measured quantity of fuel oil through an axially extending opening in the injector body into the space between the pistons. The quantity of the fuel oil so introduced is measured by metering pin 32. The fuel injector sprays or atomizes the fuel as it is introduced into the cylinder, and the finely divided fuel is ignited by reason of the high temperature of the gas into which it is introduced, this temperature being produced by compression of the air charge between the two pistons in the cylinder. Means for supplying oil to the injector and for operating metering pin 32 and injection plunger 31 may be of any suitable conventional type, and are not shown in detail here since they are well-known devices.

The engine herein described and shown is of the Diesel type operating according to the well-known Diesel cycle. However, it will be realized that the engine may readily be adapted to relatively light hydrocarbon fuels which are vaporized in a carburetor and fed into the cylinder along with the ingoing charge of air entering through intake portion 22. Under these circumstances, the charge is ordinarily spark-ignited; and in order to adapt the engine to fuels of this type, fuel injector 30 in each cylinder may be replaced by a spark-plug for firing the fuel charge in the cylinder. Of course, under these circumstances, the engine will be supplied with the usual electrical accessories for electrical ignition.

The two cylinders of cylinder block 11 are connected together and held in alignment by webs 35 and 36 at each end of the block and centrally located bearing block 37. These inter-connecting members have the additional function of supporting the drive linkage and the drive shaft, as will be further pointed out later.

Cylinder block 11 having been described in detail, it will be understood that cylinder block 10 is the same in construction and arrangement of all parts, except that some parts, as the exhaust and intake manifolds, are of opposite hand, as may be seen from Fig. 1.

It will be noticed from Figs. 1 and 2 that the two cylinders in each block are separated from each other sufficiently to permit passage therebetween of drive-shaft 40 which extends horizontally and projects beyond the engine to be coupled with any suitable mechanism. Drive-shaft 40 is provided with a single crank 41 which is located between the two cylinder blocks 10 and 11. Power is transmitted from the pistons in the four cylinders to the crankshaft by means of suitable driving linkage, which will be now described. It will be seen from the following description that this driving linkage not only serves to transmit power from the pistons to the crankshaft to rotate the latter, but it also controls the movement of the pistons in such a manner as to cover and uncover the exhaust and intake ports in the cylinders in a particular sequence to secure improved operation of the engine.

Each of cylinder blocks 10 and 11 with its parallel cylinders has its own drive linkage which drivingly connects all four pistons of that cylinder block to crank 41 on shaft 40. Since the drive linkage for each cylinder block is a duplicate of the other, it is only necessary here to describe the linkage associated with one block, although in the following description reference is made to parts of both blocks since neither block alone is shown completely.

Pivotally mounted at the right and left ends of cylinder block 11, are rocking levers 43 and 44 respectively, each rocking lever being mounted to oscillate about a centrally located, horizontal axis. Rocking lever 43 is connected at its outer ends to pistons 16 and 19 by means of links 45, the connection at each end of links 45 being of the conventional pin type. The outer ends of the lower rocking lever 44 are similarly connected by means of links 45 to pistons 17 and 20 in the left ends of cylinders 14 and 15.

The means for pivotally mounting the right hand rocking levers 43 of both cylinder blocks is better seen in Fig. 1. Each rocking lever 43 is formed integrally with a central sleeve 46 which is rotatably mounted on hollow shaft 47, and the shaft in turn is supported at each end by a short stub shaft 48 which is received in a counterbore in the end of shaft 47. The stub shafts are pressed or threaded into the counterbores. Each end of hollow shaft 47 has a terminal portion of reduced external diameter 47a which fits snugly within a bore in web 35 extending between the two cylinders of the block. The shoulder between the main portion of the shaft and end portion 47a butts up against the inner vertical face of web 35. The reduced diameter portion 47a of shaft 47 extends beyond web 35, and this extension is provided with external threads to receive nut 49 which is screwed onto the shaft and engages the outer vertical face of web 35. Thus shaft 47 is securely attached at its ends to web 35 of each cylinder block 10 and 11, and, in addition to being a bearing for a pair of rocking lever sleeves 46, the shaft also serves to tie the two cylinder blocks together. A similar construction at the other end of the engine, including hollow shaft 47b and stub shafts 48a carrying rocking levers 44, connects the two cylinder blocks together at the two ends.

The four stub shafts 48 and 48a provide means for supporting the engine, the outer ends of the shafts being supported in four sockets which are part of any desired type of frame, indicated generally at 50. The frame may be a stationary base, or the frame of a vehicle in which the engine is placed.

As may be seen from Fig. 1, rocking lever 43 is near the outer end of sleeve 46, and near the other or inner end of the sleeve there is located lever arm 52, also integral with sleeve 46. Rocking lever 43 and arm 52 are preferably both formed integrally with sleeve 46 to provide a rigid connection between the arm and lever, though any other construction may be used such that arm 52 bears a fixed relation to lever 43 and consequently oscillates equally therewith.

There is shown in Fig. 2, a similar arm 53 rigidly attached to rocking lever 44 by means of sleeve 54, with which both arm 53 and lever 44 are integral. Sleeve 54 is journaled on hollow shaft 47a, and the lever and arm oscillate as a unit about the shaft.

Figure 9:
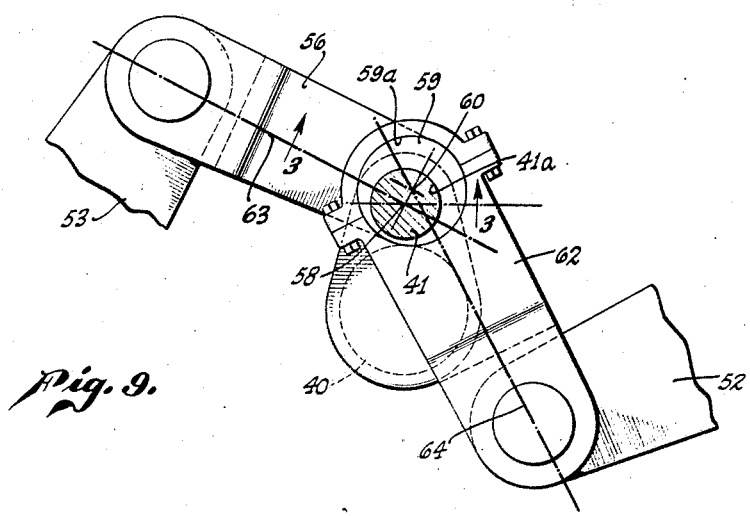
Fig. 9 is an enlarged fragmentary view of the crank and attached connecting rods.

The outer end of left arm 53 is connected to crank 41 by means of member 56 which for convenience of designation is termed the master connecting rod. This construction is shown in greater detail in Fig. 9 from which it will be seen that crank 41 is provided with a journal bearing having a cylindrical bearing surface 41a. One end of master connecting rod 56 is attached to this bearing on the crank, and consequently horizontal axis 58 of the crank journal bearing is the axis about which the master connecting rod rotates with respect to the crank.

The end of the master connecting rod which is attached to the crank has an enlarged portion 59 which has an outer cylindrical surface 59a that forms a second journal bearing that is fixed on the master rod and surrounds the crank bearing. The axis of this second bearing is located at 60 and is eccentric to or offset from, but parallel to, axis 58. The outer end of the right hand lever arm 52 is attached to bearing 59a on connecting rod 56 by means of member 62, which is termed the secondary connecting rod. Thus the secondary connecting rod is connected to crank 41 not directly, but indirectly through its connection to the bearing on the master rod 56; and the axis of rotation of that end of secondary rod 62 with respect to crank 41 is axis 60 which is the axis of the cylindrical bearing surface 59a on portion 59 of the master connecting rod.

By virtue of this construction, axes 58 and 60, which are respectively the axis of rotation of the master and of the secondary connecting rods, are offset or spaced from one another, the direction of offset being transverse, and preferably substantially perpendicular, to the longitudinal axis 63 of the master connecting rod. However, experiments have shown that axis 60 may be shifted parallel to axis 63 a short distance from the location shown; but that the advantages obtained by this construction progressively decrease as a result of such shift. Practically, the limits of the shift are approximately such that a line passing through axes 58 and 60 makes an angle of not more than 45° with the perpendicular to axis 63. The amount of this offset (measured perpendicularly to axis 63) is preferably about $\frac{3}{8}''$, but for practical purposes may vary from $\frac{1}{4}''$ to $\frac{1}{2}''$ for an engine of the size shown. The advantageous operation is marked within the limits indicated but substantially disappears when the eccentricity is decreased to $\frac{1}{8}''$, as with this small spacing between axes 58 and 60, the timing of the pistons with respect to the cylinder ports, as described later, does not give desirable operating conditions. Of course, the amount of offset can be varied with the other dimensions of the engine, but not at the same rate, as it is found to remain closer to the values given.

As a consequence of this construction, the amount of offset between these two axes of relative rotation is constant in amount, and is constant in direction with respect to longitudinal axis 63, although the offset does not bear a fixed directional relation to longitudinal axis 64 of secondary rod 62 since the two longitudinal axes 63 and 64 oscillate through an arc with respect to each other as crank 41 rotates drive-shaft 40. The path of axis 58 around the center of drive shaft 40 is circular, but the path of axis 60, although closely similar in shape, is not circular.

It will be clear without going into detail, that the relative eccentricity of axes 58 and 60 and the difference in the precise shape of the paths followed by them as they rotate around the center of drive shaft 40 results in a difference between the accelerations or decelerations of the two pistons in either cylinder at any instant when the pistons are near the extreme outer ends of their working strokes. As a consequence of this construction, pistons 17 and 20, which are connected to master connecting rod 56, have a different motion during the end portion of the working stroke and the initial portion of the compression stroke than do pistons 16 and 19 which are connected to secondary connecting rod 62. The period during which these differences in motion are of consequence is that period in which the exhaust and intake ports are uncovered; and the results of these differences in movement are described below in connection with diagrammatic Figs. 4–8 inclusive.

It is preferred, though not necessary, in designing the engine, that the general relation of dimensions shown be retained. The axes of sleeves 46 and 54 and drive shaft 40 all lie on a straight line, with shaft 40 midway between the sleeve axes and since these axes are parallel they all lie in the same plane. Arm 52 and connecting rod 62 are equal in length to the sides of a square of which the distance between the axes of sleeve 46 and shaft 40 is the diagonal. The distance from the axis of rotation of rocking lever 43 to the connection of each link 45 is also equal to the side of the same square. The same dimensions are used for the other half of the driving linkage, i. e., connecting rod 56, arm 53, and lever 44. It will also be noted that arm 53 is connected to connecting rod 56 at one side of the above-mentioned plane and that arm 52 is connected to connecting rod 62 at the other side of said plane. Minor variations from this relationship may of course be made without appreciable change in operation of the engine as described; but a substantial variation in one part may necessitate substantial compensating changes in other parts to secure the desired mode of operation.

One cylinder block with a pair of cylinders, two pistons reciprocating within each cylinder, and the drive linkage just described which interconnects the four pistons to the crank on the drive shaft, all constitute a single complete operating unit; and it is within the scope of my invention to make a complete engine of but this single unit. However, it is preferred that the engine have four or more cylinders, since the construction lends itself particularly to a four-cylinder engine which secures maximum advantage from the invention. Because a four-cylinder engine comprises essentially two complete operating units drivingly connected to a single crank on the drive shaft, the foregoing description has been limited to block 11 and associated structure comprising one complete unit. It will be appreciated that the structure of the other unit is similar, except in some instances in which parts may be made of opposite hand in order to make an engine which is generally symmetrical about a vertical plane passing transversely through crank 41. For example, the drive linkage transmitting power to the crank from the pistons in block 11 has the same arrangement as the linkage for the pistons in block 10, when viewed from the outside of the cylinder block and looking along the crankshaft, except that upper pistons 16 and 19 in cylinder block 10 are connected to the master connecting rod while the lower pistons 17 and 20 in block 11 are connected to the secondary connecting rod. As constructed, both cylinder blocks operate in the same manner, but are 90° out of phase with each other. Consequently, as will be seen from the following description of the operation of the engine, in each block the two power strokes commence 180° apart measured by degrees of revolution of drive shaft 40; and since the two blocks are 90° out of phase, a power stroke commences in one of the four cylinders for each 90° of revolution of drive shaft 40.

Figure 4:
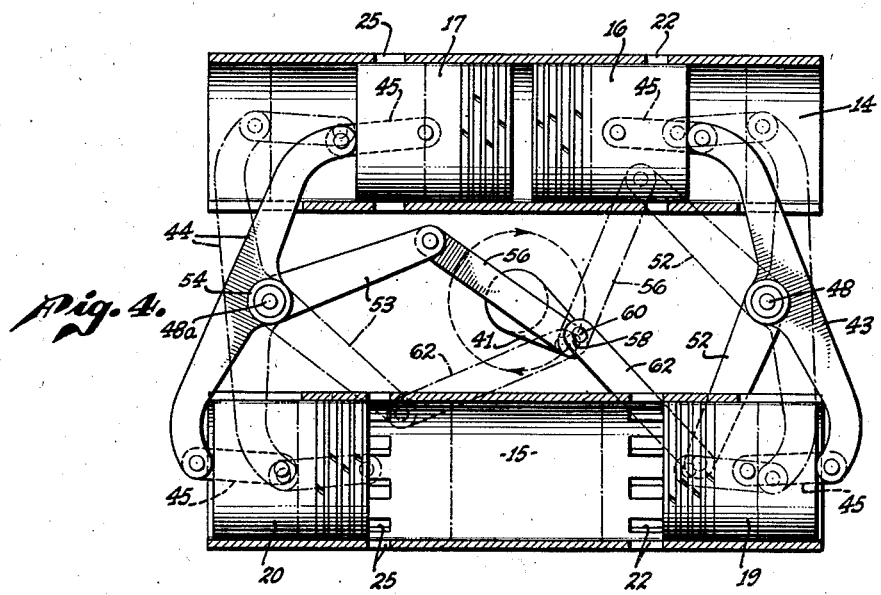

The operation of my improved engine will be better understood by reference to the diagrams contained in Figs. 4–8 inclusive which show successive positions of the several parts of the engine during one-half an operating cycle. In Fig. 4, pistons 16 and 17 in cylinder 14 are shown in the position of closest approach to each other, which is at the beginning of the power or expansion stroke. Pistons 19 and 20 in cylinder 15 are 180° out of phase, that is, pistons 19 and 20 are at the extreme of their outward movement away from each other where they have respectively fully uncovered intake ports 22 and exhaust ports 25. The pistons are at the end of the working stroke and at the commencement of the compression stroke, during which they move toward each other. The position of the drive linkage of the other cylinder block 10 at this time is shown in Fig. 4 by dot-dash lines.

Starting with pistons 16 and 17 in the position in cylinder 14 shown in Fig. 4, assume that a fuel charge has been introduced into the body of highly compressed air held between pistons 16 and 17, and that this fuel charge has been ignited. The pressure of the expanding gases drives pistons 16 and 17 apart as is seen from the successive positions of Fig. 5 and Fig. 6. This is the power stroke. Continued outward motion of the pistons brings them to the position of Fig. 7 in which the working face of piston 17 has reached the upper edge of exhaust ports 25, and further movement of the piston will partially open these ports. In this position it will be noted that the working face of piston 16 has not yet reached the lower edge of intake ports 22, and consequently this piston will move for a short distance before opening, even partially, the intake ports.

Figure 8:
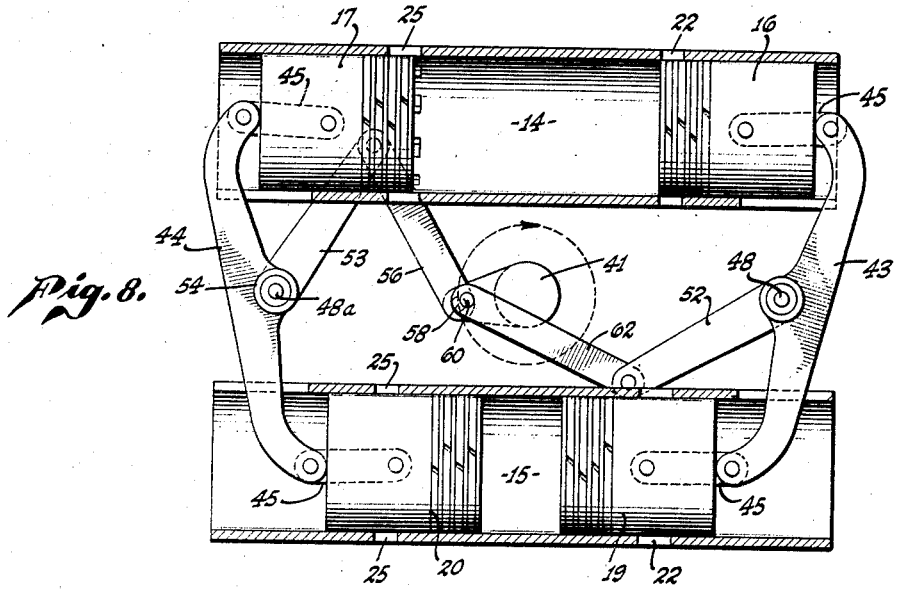

Slight additional movement of pistons 16 and 17 brings them into the position of Fig. 8, in which further movement of piston 16 will begin to uncover intake ports 22, and piston 17 is in a position such that exhaust ports 25 have been partly uncovered. During the interval of time between the positions of Figs. 7 and 8, the products of combustion contained in the cylinders have, to a large extent, been exhausted through exhaust ports 25 by expansion of the gases. The power stroke is considered to last until the pistons reach an extreme outward position. However, power delivery decreases rapidly after the position of Fig. 7 is passed, and by the time the position of Fig. 8 is reached a large proportion of the gases has been exhausted through ports 25.

In the position of Fig. 8, it will be realized that hot gases from the cylinder can pass through the exhaust ports, but as yet intake ports 22 are not open. Further movement of the pistons away from each other brings them ultimately to the extreme ends of their outward movement when pistons 16 and 17 fully uncover both the intake and exhaust ports. This position is the same as is shown in Fig. 4 in connection with pistons 19 and 20. In the interval of time between the position of Fig. 8 and the end of the power stroke, corresponding to the position in Fig. 4 of pistons 19 and 20, clean air under pressure is introduced through intake ports 22 into the upper end of the cylinder, and sweeps downwardly through the cylinder to scavenge the cylinder of products of combustion, the air leaving the cylinder through exhaust ports 25. Drive shaft 40 has rotated 180° by now from its original position in Fig. 4, thus completing the outward stroke of pistons 16 and 17 and terminating the first half of the operating cycle in cylinder 14.

It will be understood that the piston movements just described take place also in cylinder 15 during the first half of each operating cycle for that cylinder, since the complete cycle in each cylinder is the same.

Figure 5:
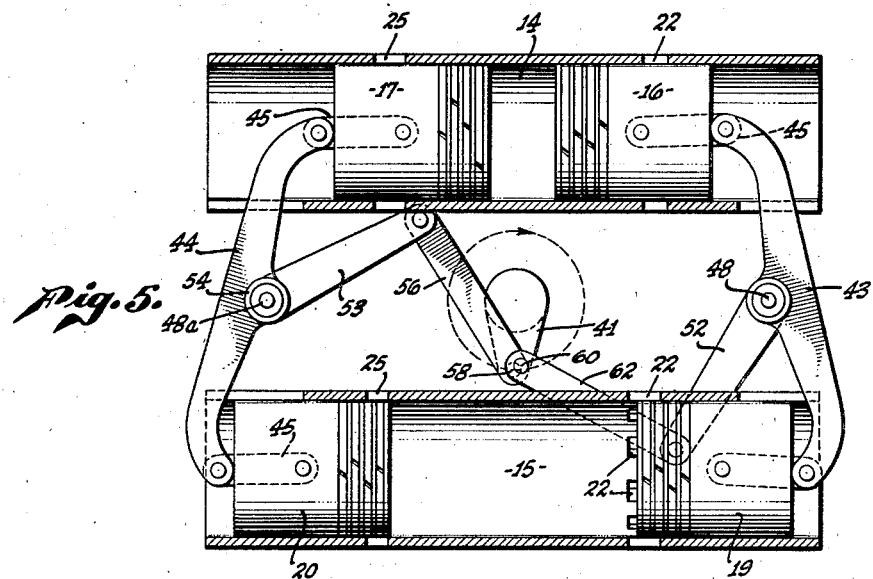

The second half of an operating cycle, or the compression stroke, is shown in Figs. 4–8 in cylinder 15, and will be described with reference to that cylinder. At the beginning of the compression stroke (Fig. 4) and until the position of pistons 19 and 20 in Fig. 5 is reached, scavenging of the cylinder continues, and the clean air entering through the intake ports sweeps through the cylinder and out through the exhaust ports. Motion of the two pistons toward each other effects no compression while either set of ports is open, but the pistons pass through the position of Fig. 2 and reach the position of Fig. 5 in which exhaust ports 25 are completely closed by piston 20, though piston 19 has not yet completely covered intake ports 22. Consequently, clean air still enters the cylinder through the intake ports.

The influx of air continues during the interval between the positions of Figs. 5 and 6, as in Fig. 6 piston 20 keeps exhaust ports 25 closed, and piston 19 has just moved down to the lower edge of intake ports 22 and thus completely closed these ports.

During the interval between the positions of Figs. 5 and 6, air enters the cylinder because of the pressure maintained in the intake manifold, which is supplied with air under superatmospheric pressure; and consequently, the charge of air contained in cylinder 15 between the two pistons is now at superatmospheric pressure. The interval of time between the positions of Figs. 5 and 6 may be termed a period of supercharging, because during this period a charge of air under superatmospheric pressure is introduced into and retained in the cylinder in order to support combustion therein during the working stroke.

Pistons 19 and 20 continue to move toward each other through the positions of Figs. 7 and 8 until they reach the end of their motion toward each other, which is the end of the compression stroke. At this time they occupy with respect to each other the positions shown for pistons 16 and 17 in Fig. 4. Now the second half of the operating cycle, or compression stroke, has been completed and the crankshaft has rotated 360° from its original position, that is, it has now returned to its position when the operating cycle started. It is while the pistons are at or near the end of the compression stroke that fuel injector 30 is operated to inject a measured quantity of fuel into the cylinder, which becomes ignited because of the gas temperatures maintained therein.

From the foregoing description, it will be seen that it is a characteristic feature of my invention that opposed pistons in a pair of cylinders provided with intake and exhaust ports in their side walls, have their movements so controlled that the exhaust port in each cylinder opens before the associated intake port is opened, and the exhaust port is subsequently closed in each cylinder before the associated intake port is closed. The total period during which some portion of these two sets of ports is open, that is, uncovered at least partially by either of the pistons, may be divided into three phases.

During the first phase, the exhaust ports only are open; and during this phase high pressure products of combustion in the cylinder escape into the exhaust manifold. This is solely a pressure or expansion exhaust stage. In the second phase, both the intake and exhaust ports are open; and clean air now sweeps through the cylinder from the intake ports to the exhaust, this air being introduced under pressure from the intake manifold. This is a scavenging stage in which the pressure exhaust is supplemented by scavenging gases which displace the burned gases ahead of them. In the third or final phase, only the intake port remains open, the exhaust port having been fully closed. During this final stage, clean air from the intake manifold is still introduced under superatmospheric pressure, this air being for the purpose of maintaining combustion in the cylinder. The cylinder is full of clean air at the commencement of the stage, but during this stage additional air is introduced under manifold pressure in order to produce a supercharging effect. Consequently, the quantity of air introduced into the cylinder is in excess of that which would be possible were the air under atmospheric pressure alone.

The same operating cycle of working and compression strokes takes place in the cylinders of block 10, being spaced 90° out of phase with the cycles in block 11. This relation is easily maintained because all cylinders are connected to the single crank 41.

It should be evident that if axes 58 and 60 were coincident, the piston motion would be symmetrical and only the second phase of port opening as just described would occur, that is, both the exhaust and intake ports would open and close in one cylinder at the same time. Consequently, the eccentricity of axes 58 and 60 creates the first and third phases just described. In general, an increase in the eccentricity increases the duration of the first and third phases when only the exhaust or intake ports respectively are open, and shortens the period when both are open. However, the two increases are not in direct proportion to each other. An upper limit to the eccentricity is placed by the need of similar timing at both ports and by the need for adequate scavenging.

Thus it will be seen that my invention has several advantageous features. There is no loss of fuel, because of the manner of fuel injection, and the relatively higher initial pressure on the air charge in the cylinder because of high intake manifold pressure is maintained without being diminished by loss of air to the exhaust manifold. Also, it is possible to connect either two or four cylinders to but a single crank, which makes for a light, compact construction occupying a minimum of space. Valve gear and operating mechanism therefor are all eliminated, thus making for simplicity of construction and operation. The main drive shaft extends between the two cylinders of each pair and is located at the center of the engine, thus eliminating the necessity of dual crankshafts or long connecting links which transmit power to the main drive shaft from the pistons.

Another advantage of my improved construction is the ease of assembly and disassembly. To assemble the cylinder blocks, the ends of the crankshaft are pushed through the bearing blocks 37 in each cylinder block, then two each of sleeves 46 and 54 are placed on the shafts 47 and 47a, the ends of the shafts inserted in webs 35 and 36 of the cylinder blocks, and all these parts are held in place by tightening up the four nuts 49. Subsequently the connection of the connecting rods to the crankshaft and the pistons to the rocking levers, can be made. Disassembly is easily accomplished by reversing this procedure.

Another advantage is that the direction of crankshaft revolution can be reversed merely by changing the function of the exhaust and inlet ports. This can be done by so interconnecting the exhaust and intake manifolds with suitable valves, that the clean air can be introduced to manifold 26 and ports 25, and exhaust removed through ports 22 and manifold 23.

It will be realized that many changes may be made in the size, shape, and arrangement of parts without departing from the spirit and scope of my invention; and consequently, it is to be understood that the foregoing description of my engine is to be considered as illustrative of rather than limitative upon the invention as defined in the appended claims.

I claim:

1. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft extending transversely between the two cylinders; and drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed; said drive linkage comprising a rocking lever at each end of the cylinders connected to a piston in each cylinder, an arm rigidly attached to each rocking lever, a crank on said crankshaft, a first connecting rod connected directly to one arm and to the crank, and a second connecting rod connected to the other arm and to the first rod at the end connected to the crank in such manner that the axis of rotation of the second rod relative to the crank is eccentric to the axis of rotation of the first rod relative to the crank in a direction transverse to the longitudinal axis of the first rod.

2. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft; and drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed; said drive linkage comprising a rocking lever at each end of the cylinders connected to a piston in each cylinder, an arm rigidly attached to each rocking lever, a crank on said crankshaft provided with a journal bearing, a first connecting rod connected to one arm and to said crank bearing, said rod being provided with a journal bearing surrounding the crank bearing but eccentric thereto in a direction substantially perpendicular to the longitudinal axis of the first rod, and a second connecting rod connected to the other arm and to the bearing on the first rod.

3. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft having a single crank; and drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed, and said linkage including a pair of connecting rods connected to the single crank, one of said rods being displaced eccentrically from the other in a direction transverse to the longitudinal axis of said other rod.

4. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft extending transversely between the two cylinders; drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed; said drive linkage comprising a rocking lever at each end of the cylinders connected to a piston in each cylinder, an arm rigidly attached to each rocking lever, a crank on said crankshaft, a first connecting rod connected directly to one arm and to the crank, and a second connecting rod connected to the other arm and to the first rod at the end connected to the crank in such manner that the axis of rotation of the second rod relative to the crank is eccentric to the axis of rotation of the first rod relative to the crank in a direction transverse to the longitudinal axes of the first connecting rod; and means communicating with the intake port to introduce air under superatmospheric pressure into each cylinder during the time between closing of the exhaust port and closing of the intake port.

5. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft extending transversely between the two cylinders; and drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed; said drive linkage comprising a rocking lever at each end of the cylinders connected to a piston in each cylinder, each of said rocking levers being pivoted about an axis parallel to the crankshaft axis and all of said axes lying substantially in the same plane, the axes of the rocking levers being located on opposite sides of the crankshaft axis, an arm rigidly attached to each rocking lever, a crank on said cranksahft, a first connecting rod having one end connected directly to the crank and having the other end connected to one arm at a position at one side of said plane, and a second connecting rod having one end connected to the other arm at a position on the other side of said plane and having the other end connected to said one end of the first rod in such manner that the axis of rotation of the second rod relative to the crank is eccentric to the axis of rotation of the first rod relative to the crank in a direction transverse to the longitudinal axis of the first rod.

6. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft extending transversely between the two cylinders; and drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed; said drive linkage comprising a rocking lever at each end of the cylinders connected to a piston in each cylinder, each of said rocking levers being pivoted about an axis parallel to the crankshaft axis and all of said axes lying substantially in the same plane, the axes of the rocking levers being located on opposite sides of the crankshaft axis, an arm rigidly attached to each rocking lever, a crank on said crankshaft, a first connecting rod having one end connected directly to the crank and having the other end connected to one arm at a position on one side of said plane, and a second connecting rod having one end connected to the other arm at a position on the other side of said plane and having the other end connected to said one end of the first rod in such manner that the axis of rotation of the second rod relative to the crank is eccentric to the axis of rotation of the first rod relative to the crank in a direction substantially perpendicular to the longitudinal axis of the first rod; the lengths of the connecting rods, and the lengths of each arm as defined by the distance from its associated rocking lever axis to the position of its attachment to its associated connecting rod, being substantially equal.

7. An internal combustion engine comprising a pair of spaced, parallel cylinders each having an intake and an exhaust port spaced from each other axially of the cylinder, similar ports being located at the same ends of both cylinders; a pair of pistons in each cylinder, each piston opening and closing one of said ports; a crankshaft; and drive linkage interconnecting said pistons and transmitting power to the crankshaft, said linkage controlling the movement of the pistons to open the exhaust port in each cylinder before the associated intake port is opened and to close the exhaust port in each cylinder before the associated intake port is closed; said drive linkage comprising a rocking lever at each end of the cylinders connected to a piston in each cylinder, each of said rocking levers being pivoted about an axis parallel to the crankshaft axis and all of said axes lying substantially in the same plane, the axes of the rocking levers being located on opposite sides of the crankshaft axis, an arm rigidly attached to each rocking lever, a crank on said crankshaft provided with a bearing, a first connecting rod having one end connected to said crank bearing and having the other end connected to one arm at a position at one side of said plane, said rod being provided with a journal bearing surrounding the crank bearing but eccentric thereto in a direction substantially perpendicular to the longitudinal axis of the first rod, and a second connecting rod having one end connected to said journal bearing and having its other end connected to the other arm at a position at the other side of said plane; the lengths of the connecting rods, and the lengths of each arm as defined by the distance from its associated rocking lever axis to the position of its attachment to its associated connecting rod, being substantially equal.

JOHN R. TUCKER.